United States Patent
Paskov et al.

(10) Patent No.: US 12,472,107 B2
(45) Date of Patent: Nov. 18, 2025

(54) DETECTING DEVICE FOR DETECTING A STATE OF A DIAPER, DIAPER ACCOMMODATING THE DETECTING DEVICE

(71) Applicant: SD SENSITIVE DIAPER GMBH, Berlin (DE)

(72) Inventors: Pasko Todorov Paskov, Varna (BG); Biser Nedelchev Banev, Varna (BG); Stanislav Tchavdarov Petkov, Berlin (DE); Stanislav Petkov, Berlin (DE); Peter Babourkov, Berlin (DE)

(73) Assignee: SD SENSITIVE DIAPER GMBH, Berlin (DE)

( * ) Notice: Subject to any disclaimer, the term of this patent is extended or adjusted under 35 U.S.C. 154(b) by 854 days.

(21) Appl. No.: 17/617,826

(22) PCT Filed: Jun. 12, 2020

(86) PCT No.: PCT/EP2020/066294
§ 371 (c)(1),
(2) Date: Dec. 9, 2021

(87) PCT Pub. No.: WO2020/249725
PCT Pub. Date: Dec. 17, 2020

(65) Prior Publication Data
US 2022/0226167 A1    Jul. 21, 2022

(30) Foreign Application Priority Data
Jun. 13, 2019    (EP) .................................... 19179897

(51) Int. Cl.
*A61F 13/42*     (2006.01)
*A61B 5/00*      (2006.01)
*A61F 13/49*     (2006.01)

(52) U.S. Cl.
CPC ................ *A61F 13/42* (2013.01); *A61B 5/72* (2013.01); *A61F 13/49058* (2013.01);
(Continued)

(58) Field of Classification Search
CPC .... A61F 13/42; A61F 2013/424; A61F 13/84; A61B 5/6808; A61B 5/6802;
(Continued)

(56) References Cited

U.S. PATENT DOCUMENTS 6,097,297 A * 8/2000 Fard ........................ A61F 13/42
340/573.5
6,200,250 B1 * 3/2001 Janszen ................... A61F 13/42
493/938
(Continued)

FOREIGN PATENT DOCUMENTS

CN    1226855 A    8/1999
CN    1380547 A    11/2002
(Continued)

OTHER PUBLICATIONS

Chinese Office Action dated Jul. 22, 2022 corresponding to Chinese Patent Application No. 202080057120.9, along with Search Report.
(Continued)

*Primary Examiner* — Nicholas J. Weiss
*Assistant Examiner* — Seth Han
(74) *Attorney, Agent, or Firm* — SQUIRE PATTON BOGGS (US) LLP

(57) ABSTRACT

A device for detecting a state of a diaper includes a sensor unit with a conducting unit including at least two electrodes. The electrodes are configured to detect electrical parameters of their environment. A coupling portion is disposed on at least one end side of the conducting unit and is connectable to a measuring device. The conducting unit is attached to a carrier layer. The measuring device comprises an input
(Continued)

portion being connectable to the sensor unit, and a processor configured to receive signals corresponding to values of the electrical parameters detected by the sensor unit and to process said signals. A power control means is configured to control electrical power supplied from a power supply, and a determination means is configured to determine whether a state of a diaper has changed. A transmitting means is configured to transmit information regarding the determined state change to a receiving means.

16 Claims, 9 Drawing Sheets

(52) U.S. Cl.
CPC . *A61B 2560/0214* (2013.01); *A61F 2013/424* (2013.01); *A61F 2013/49063* (2013.01)

(58) Field of Classification Search
CPC ....... G08B 21/20; G01P 13/00; G01N 27/223; G01N 27/22; G01N 27/227
See application file for complete search history.

(56) References Cited

U.S. PATENT DOCUMENTS

| | | | | |
|---|---|---|---|---|
| 6,623,466 | B1* | 9/2003 | Richardson | A61F 13/15211 |
| | | | | 604/385.19 |
| 2007/0020701 | A1 | 1/2007 | Menon et al. | |
| 2008/0278337 | A1* | 11/2008 | Huang | A61F 13/42 |
| | | | | 340/573.5 |
| 2009/0326417 | A1* | 12/2009 | Ales, III | G16H 40/67 |
| | | | | 600/584 |
| 2010/0008794 | A1* | 1/2010 | Rush | A61M 5/14244 |
| | | | | 417/416 |
| 2012/0109087 | A1* | 5/2012 | Abraham | A61F 13/42 |
| | | | | 604/361 |
| 2013/0018340 | A1 | 1/2013 | Abraham et al. | |
| 2014/0296808 | A1 | 10/2014 | Curran et al. | |
| 2014/0333441 | A1* | 11/2014 | Solazzo | A61F 13/42 |
| | | | | 340/573.5 |
| 2016/0314264 | A1* | 10/2016 | Berland | A61F 13/42 |
| 2017/0252225 | A1* | 9/2017 | Arizti | A61F 13/42 |
| 2017/0258643 | A1* | 9/2017 | Xu | A61F 13/42 |
| 2017/0336337 | A1* | 11/2017 | Yli-Hallila | G01N 27/22 |
| 2018/0333306 | A1* | 11/2018 | Ahong | A61B 5/6843 |
| 2020/0217812 | A1* | 7/2020 | Kwak | H01G 7/00 |

FOREIGN PATENT DOCUMENTS

| | | | |
|---|---|---|---|
| CN | 101340876 | A | 1/2009 |
| CN | 105392456 | A | 3/2016 |
| CN | 109862857 | A | 6/2019 |
| JP | 07-239990 | A | 9/1995 |
| JP | 2000-342615 | A | 12/2000 |
| JP | 2004-085277 | A | 3/2004 |
| JP | 2011-136055 | A | 7/2011 |
| JP | 2017-215209 | A | 12/2017 |
| JP | 2018-105787 | A | 7/2018 |
| RU | 2686333 | C2 | 4/2019 |
| WO | WO 99/33037 | A1 | 7/1999 |
| WO | WO 2013/013197 | A1 | 1/2013 |
| WO | WO 2016/090492 | A1 | 6/2016 |

OTHER PUBLICATIONS

Examination Report dated Aug. 12, 2024 in corresponding Indian Patent Application No. 202117059359.
Search Report dated Oct. 6, 2023, corresponding to Russian Patent Application No. 2021136494.
International Search Report and Written Opinion dated Aug. 5, 2020 corresponding to International Patent Application No. PCT/EP2020/066294.
Extended European Search Report dated Dec. 13, 2019 corresponding to European Patent Application No. 19179897.4.
Notice of Reasons for Refusal dated May 7, 2024 corresponding to Japanese Patent Application No. 2021-573724, with English translation thereof.

* cited by examiner

DETECTING DEVICE FOR DETECTING A STATE OF A DIAPER, DIAPER ACCOMMODATING THE DETECTING DEVICE

The invention relates to a detecting device for detection and differentiation of urine and feces in disposable diapers, and to a diaper accommodating said detecting device.

BACKGROUND

Monitoring the state of disposable diapers is an important task for caregivers to infants, toddlers, children, people of advanced age or people impaired by movement difficulties or an incapacitating illness. Specifically, multiple types of devices and systems provide monitoring, indicating and reporting on various conditions: urination and defecation. Such devices can be divided into four types according to the measuring method used:

1. Chemical analysis based on an indicator changing its color depending on the substances that fall into the absorbent layer of the diaper. Such devices are simple and relatively inexpensive for production. However, such devices require a direct visibility of the diaper by the caregiver.
2. Urinary sensors based on a change in conductivity between two or more conductive elements. An example is disclosed by US 2018 177 644 A1. Such devices improve reliability and enable a notification of the caregiver without direct monitoring. However, the provided devices are complex and expensive for serial production, mainly due to the complex structure of sensors generally disposed along with the diaper, thereby requiring frequent replacement.
3. Defecation sensors based on gas analysis or conductivity measurement between two or more conductive elements. It is known that specific gases such as methane, hydrogen sulfides, etc. are released during defecation. An example is disclosed by WO 2017 078 502 A1. However, compared to devices of the first and second type, the relatively complex devices of the third type lead to an increase in cost and size as well as a decreased energy efficiency of the measuring device. Furthermore, the possibility of errors exists in case gases are produced without defecation.
4. Combinations between the second and the third types, as disclosed by EP 2 832 323 A1. The combination of the second and the third types leads to the creation of complex and expensive devices with high operating and energy costs as well as a high production value.

EXTENDED SUMMARY OF THE INVENTION

The object of the present invention is to provide a complete system for monitoring state changes in a diaper (such as urination or defecation) and notifying the caregivers at a low complexity and a low cost, as well as a resonance system for urine and feces scanning for the presence or absence of certain substances and objects at a very low cost.

The object of the invention is achieved by the technical teachings according to the following items:

1. Detecting device for detecting a state of a diaper, comprising a sensor unit with: a conducting unit including at least two electrodes, the electrodes being configured to detect electrical parameters of their environment; a coupling portion on at least one end side of the conducting unit, the coupling portion being connectable to a measuring device; and a carrier layer to which the conducting unit is attached. The measuring device comprises an input portion being connectable to the sensor unit; a processor configured to receive signals corresponding to values of the electrical parameters detected by the sensor unit and to process said signals; a power control means configured to control electrical power supplied from a power supply; a determination means configured to determine, based on evaluating the processed signals using predetermined thresholds of the electrical parameters during predetermined time periods, whether a state of a diaper has changed; and a transmitting means arranged for transmitting information regarding the determined state change to a receiving means. The measuring device is configured to perform a resonance scan, during which a periodic signal is sent to the sensor unit at a plurality of frequencies.

A detecting device for detecting a state of a diaper (henceforth referred to as detecting device) having the features of item 1 provides a complete system for monitoring and notification at a low complexity and a low cost. Specifically, the electrodes of the sensor unit constitute a circuit, in which electrical parameters between the sensors are affected by their environment. Above a predetermined threshold of an electrical parameter, the electrodes are regarded as being disconnected. When the environment is changed, e.g. by introducing a conductive substance (e.g. urinary liquid) near the electrodes, the electrical parameter is changed relative to that of the dry environment based on the electrical parameters of the substance as well as the concentration of conductive particles in the substance. Thereby, a timely replacement of the diapers is ensured, discomfort and illness due to an inappropriate change of diapers are eliminated, and a possibility of an early diagnostic is provided. Furthermore, detection is enabled using a sensor unit comprising few components.

By providing a sensor unit comprising few components, manufacturing costs of the sensor unit are reduced. Since the sensor unit can be disposed along with the diaper, the operating costs over time consist primarily of sensor unit replacement cost. Thus, the reduction in sensor unit costs greatly reduces the total costs of operating the detecting device compared to a detecting device having a sensor unit of a higher complexity.

The predetermined threshold can be set to an appropriate value lower than a resistance in a dry environment, but higher than the highest resistance resulting from an amount of conductive substance. The amount and properties of the conductive substance can be set in accordance with the expected use case, e.g. a small amount of liquid for a newborn and a larger amount of liquid for an adult.

By setting the predetermined threshold of the determination means of the measuring device, the detecting device is applicable to different users without necessitating a replacement of the measuring device. Thereby, total costs are further reduced in a case, in which the detecting device is applied to different users throughout the operational life of the detecting device.

In addition, the measuring device to which the sensor unit is connected is also of low complexity and thus low costs. Furthermore, the measuring device is capable of resonance scanning for the presence or absence of certain substances and objects. Thus, a resonance scanning system is provided at a very low cost by using the same sensor unit and measuring device for both detection and scanning.

2. Detecting device according to item 1, wherein the measuring device further comprises a capacitor electrically connected in parallel to the power supply. The power control means is configured to control a current flowing from the capacitor and the power supply to remain below a predetermined limit.

It is generally known that battery life is shortened considerably by frequent, abrupt surges in power consumption. In detecting devices, such an abrupt surge in power consumption occurs when the transmitter is activated upon detection of an event such as urination, defecation or a change of state of the device itself such as detachment of the sensor unit. Therefore, detecting devices transmit many times daily, depending on the frequency at which events occur.

By providing a capacitor connected in parallel to the battery according to item 2, power is at least partly supplied by the capacitor when the transmitter is activated, and the battery is not overloaded. Thus, the surge in power consumption during transmitting is reduced, thereby reducing strain on the battery and increasing battery life.

3. Detecting device according to item 1 or 2, wherein the electrodes are made of an alloy comprising at least one of copper and silver.

Copper and silver have antibacterial properties as well as appropriate conducting properties for use as electrodes in a sensor unit. In order to detect electrical parameters, the sensor unit including the electrodes is generally located within a diaper and close to the skin of a user (person wearing the diaper).

By including at least one of copper and silver in an alloy used for manufacturing the electrodes of the sensor unit, bacterial growth near the sensor unit and thus skin irritation of the user is reduced, while the electrical properties of the sensor unit are maintained compared to a sensor unit, in which neither copper nor silver are present in the electrodes.

4. Detecting device according to one of items 1 to 3, wherein the electrodes are made of an adhesive material.

Generally, the electrodes can be formed separately, e.g. by using wires, and attached to a carrier layer of the sensor unit, e.g. by an adhesive material or any other attaching means.

By providing electrodes made of an adhesive material, the electrodes are formed directly on the carrier layer without necessitating additional attachment means. Thereby, manufacturing costs of the sensor unit are further reduced.

5. Detecting device according to one of items 1 to 4, wherein the carrier layer is made of a liquid absorbing material.

Upon the occurrence of an event, for example urination, liquid is dispersed near the sensor unit. The electrical properties of the sensor unit are affected as long as liquid is present between the electrodes.

By providing a carrier layer capable of absorbing liquid, the liquid passes through the carrier layer or is quickly absorbed by it, thereby allowing the sensor unit to more quickly return to a dry state.

6. Detecting device according to one of items 1 to 5, further comprising a fixing means for fixing the conducting unit to the carrier layer, wherein the fixing means does not absorb liquid.

The electrodes generally do not absorb liquid. By providing a fixing means, which also does not absorb liquid, a liquid near the electrodes passes around the electrodes and the fixing means without being absorbed by them, thereby allowing the sensor unit to more quickly return to a dry state.

7. Detecting device according to one of items 1 to 6, wherein the measuring device further comprises a housing provided with attaching means, configured to detachably attach the measuring device to a diaper surface.

By providing a detachable attachment, the measuring device is easily removed from the diaper when the diaper is changed; thus, handling by the caregiver is facilitated.

8. Detecting device according to one of items 1 to 7, wherein the power supply is a replaceable battery disposed inside the measuring device.

When the power supply is depleted, the measuring device cannot function until the power supply is recharged. If the power supply is permanently installed in the measuring device, charging needs to be performed via a cable connection, which impairs the user's movement resulting in a user discomfort, especially for infants and toddlers.

By providing a replaceable battery as the power supply, the measuring device is restored to full functionality quickly by replacing the battery. Thus, downtime of the measuring device is reduced and user discomfort or movement restrictions during charging of the power supply are reduced.

9. Detecting device according to one of items 1 to 8, wherein, in a first state of the diaper, an electrical connection between the two electrodes is disconnected, and in a second state of the diaper, an electrical connection between the two electrodes is caused by a conductive substance accumulated in a space between the electrodes.

By configuring the detecting device such that a dry environment is a first (disconnected) state and the presence of a conductive substance is a second (connected) state, in combination with the predetermined threshold, a clear boundary between the two states is set, thereby facilitating reliable detection of state changes and also improving energy efficiency.

10. Detecting device according to any of items 1 to 8, wherein the power control means is configured to apply a sinusoidal alternating voltage to the electrodes.

By applying a sinusoidal alternating voltage to the electrodes, electric excitation is applied to the molecules in the conductive substance, thereby enabling resonance scanning.

11. Detecting device according to item 9 or 10, wherein the power control means is configured to set the periodic signal for resonance scan to preset frequencies, which are set so as to correspond to respective resonance frequencies of predetermined substances or ingredients of the substance, thereby causing resonance oscillation of the substance or ingredient of the substance; and the processor is configured to evaluate the received electrical parameters, wherein it is determined that a predetermined substance is present in the space between the electrodes of the conducting unit, when the evaluated electrical parameter is within a range that is preset with regard to said predetermined substance.

In a detecting device having the features of item 11, predetermined substances or ingredients of the substances present in the space between the electrodes are monitored. The predetermined substances or ingredients of the substance are set to a preset group of frequencies suitable for tracking general health, or in accordance with expected substances of interest related to the health condition of the user.

For example, e.g. for a toddler, general health can be tracked by detecting a group of frequencies over a broad range and thus monitoring many substances in order to determine unexpected health complications. Thereby, early detection of an onset illness is enabled.

In contrast, e.g. for a person with a specific illness, the group of frequencies can be set in accordance with substances or ingredients related to the illness or another reasonable expectation, e.g. by measuring glucose in a person with diabetes. Thereby, health monitoring is achieved while improving energy efficiency by avoiding unnecessary scanning.

12. Diaper comprising an absorption zone configured to absorb liquid or solid waste matter; a detecting device according to one of items 1 to 11, and a measuring device attaching means for attaching the measuring device to a non-inner side of the diaper when worn by a user. The sensor unit is arranged in said absorption zone, and the measuring device attaching means is formed by a pocket section of the diaper.

By providing a diaper with an absorption zone, in which the sensor unit of the detecting device is attached, an appropriate environment for measuring the electrical parameters is provided. Furthermore, by attaching the measuring device to a non-inner side of the diaper, comfort of the user is not impaired by the measuring device. By providing a pocket section, the measuring device is protected from mechanical interference from outside.

13. Diaper according to item 12, wherein the pocket section is formed by overlapping parts of the diaper.

Generally, adhesive strips or other overlapping parts of the diaper are used for securing the diaper to the user. By forming the pocket section by overlapping parts of the diaper, the effort to be provided by the caregiver when applying the diaper to the user is reduced. In addition, protection from unwanted manipulation is provided.

14. Diaper according to item 12, wherein the pocket section is formed as a recess in the diaper material.

By providing a recess in the diaper material and placing the measuring device in the recess, the measuring device is protected from unwanted manipulation by the user.

15. Diaper according to one of items 12 to 14, wherein the pocket section is configured to fully wrap the measuring device in a state, in which the measuring device is connected to the sensor unit and attached to the diaper.

By fully wrapping the measuring device in a state, in which the measuring device is connected to the sensor unit and attached to the diaper (operational state), comfort of the user and protection from unwanted manipulation or mechanical interference are further improved.

16. Diaper according one of items 12 to 15, wherein the carrier layer of the sensor unit is disposed between the conducting unit and the absorption zone.

When placed in the diaper, the conducting unit is on an upper side nearer to the user than the absorption zone, which can remain wet while absorbing liquid. Thus, the carrier layer acts as a separator between the absorption zone and the conducting unit, thereby allowing the sensor to dry sufficiently quickly.

Furthermore, by disposing the carrier layer between the conducting unit and the absorption zone, the conducting unit can be securely attached to the diaper without detection accuracy being subjected to interference from the absorption zone.

17. Diaper according to one of items 12 to 16, wherein the measuring device attaching means is provided on a posterior side of the user, or preferably on an anterior side of the user, or more preferably on a lateral side of the user.

By providing the measuring device attaching means on a posterior side of the user, protection from unwanted manipulation is improved. By providing the measuring device attaching means on an anterior side of the user, comfort is improved when the user, e.g. an impaired person, is laying on his/her back. By providing the measuring device attaching means on a lateral side of the user, laying comfort is further improved while unwanted manipulation is prevented.

BRIEF DESCRIPTION OF THE DRAWINGS

In the following, the invention is explained by an exemplary embodiment with reference to the following figures.

BRIEF DESCRIPTION OF THE EMBODIMENT

Figure 3:
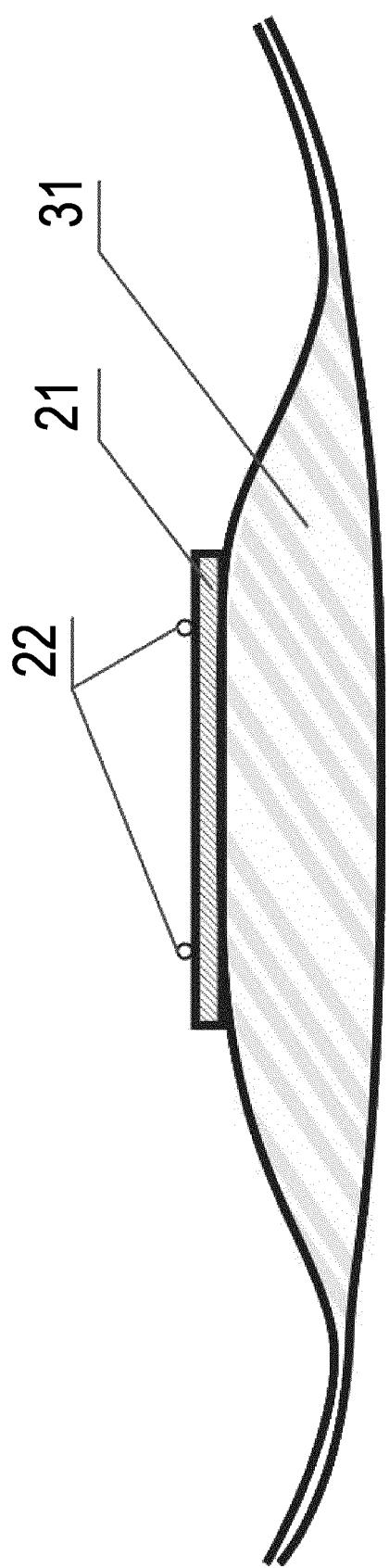
FIG. 3 shows a cross section of a diaper provided with the conducting unit shown in FIG. 2.

According to the embodiment of the invention, a detecting device 1 for detecting a state of a diaper 3 comprises a sensor unit 2 and a measuring device 4. The sensor unit 2 shown in FIG. 3 includes a conducting unit 22 including at least two electrodes 22, in which the electrodes 22 are configured to detect electrical parameters R, L, C, Z of the environment substantially of the bottom part of the diaper 3. The electrodes 22 are made of an alloy comprising at least one of copper and silver. In the present embodiment, the electrodes 22 are attached via an adhesive (not shown) to a carrier layer 21, which is made of a liquid absorbing material, e.g. a non-woven textile. The adhesive serves as a fixing means, which serve for fixing the conducting unit 22. The fixing means in this embodiment is provided by a thin layer of glue applied to one side of the conducting unit 22, wherein the conducting unit 22 is in contact with the carrier layer 21. In this embodiment, the glue is selected so as not to absorb liquid.

Figure 2:
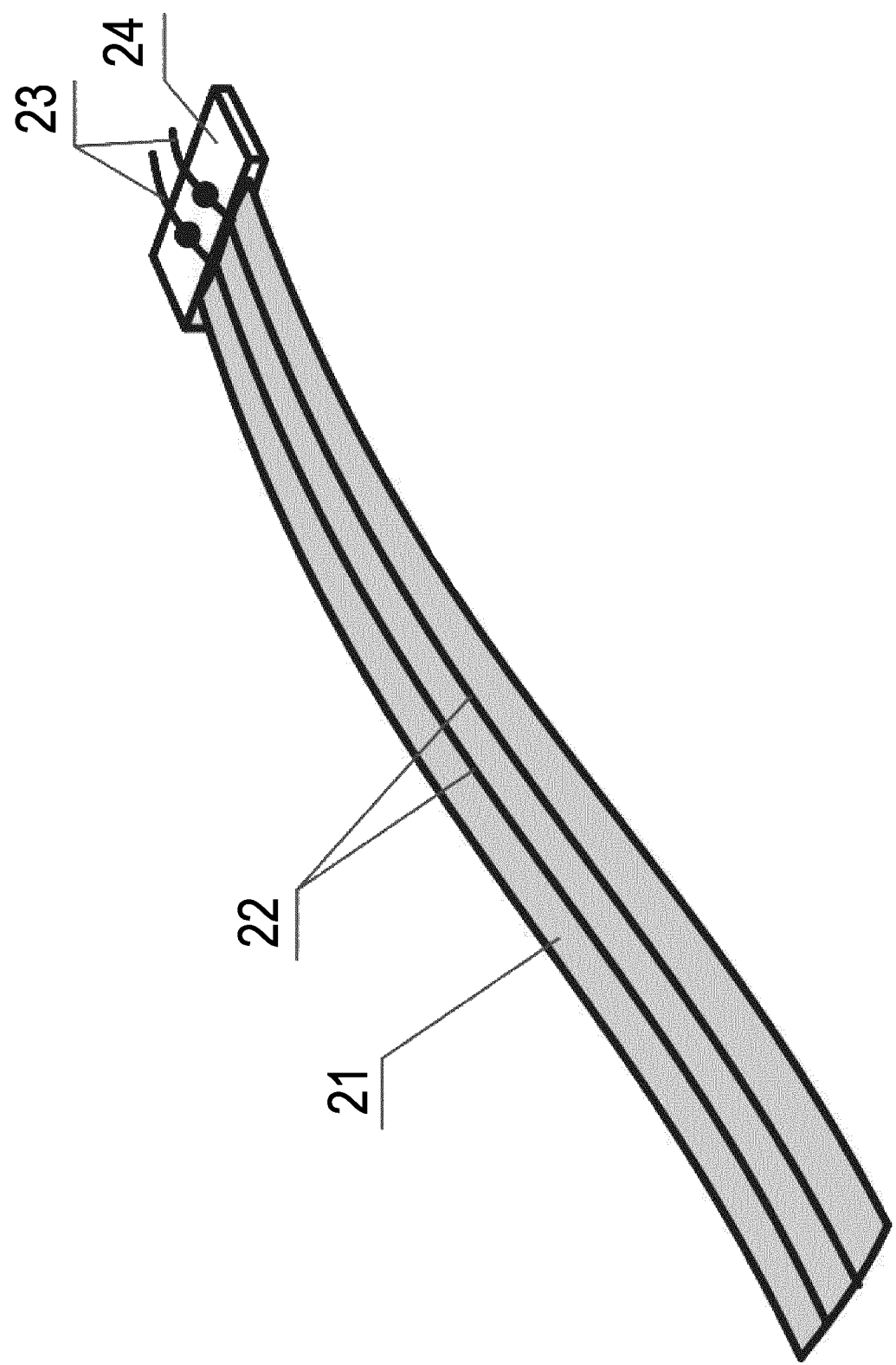
FIG. 2 is a perspective view of a conducting unit of the sensor unit of the detecting device shown in FIG. 1.

As shown in FIG. 2, the sensor unit 2 is further provided with a coupling portion 25 at one end of the conducting unit 22, wherein the coupling portion 25 is connected to the measuring device 4. The coupling portion 25 comprises longitudinal ends 23 of the electrodes 22 as well as a plug 24.

Figure 1:
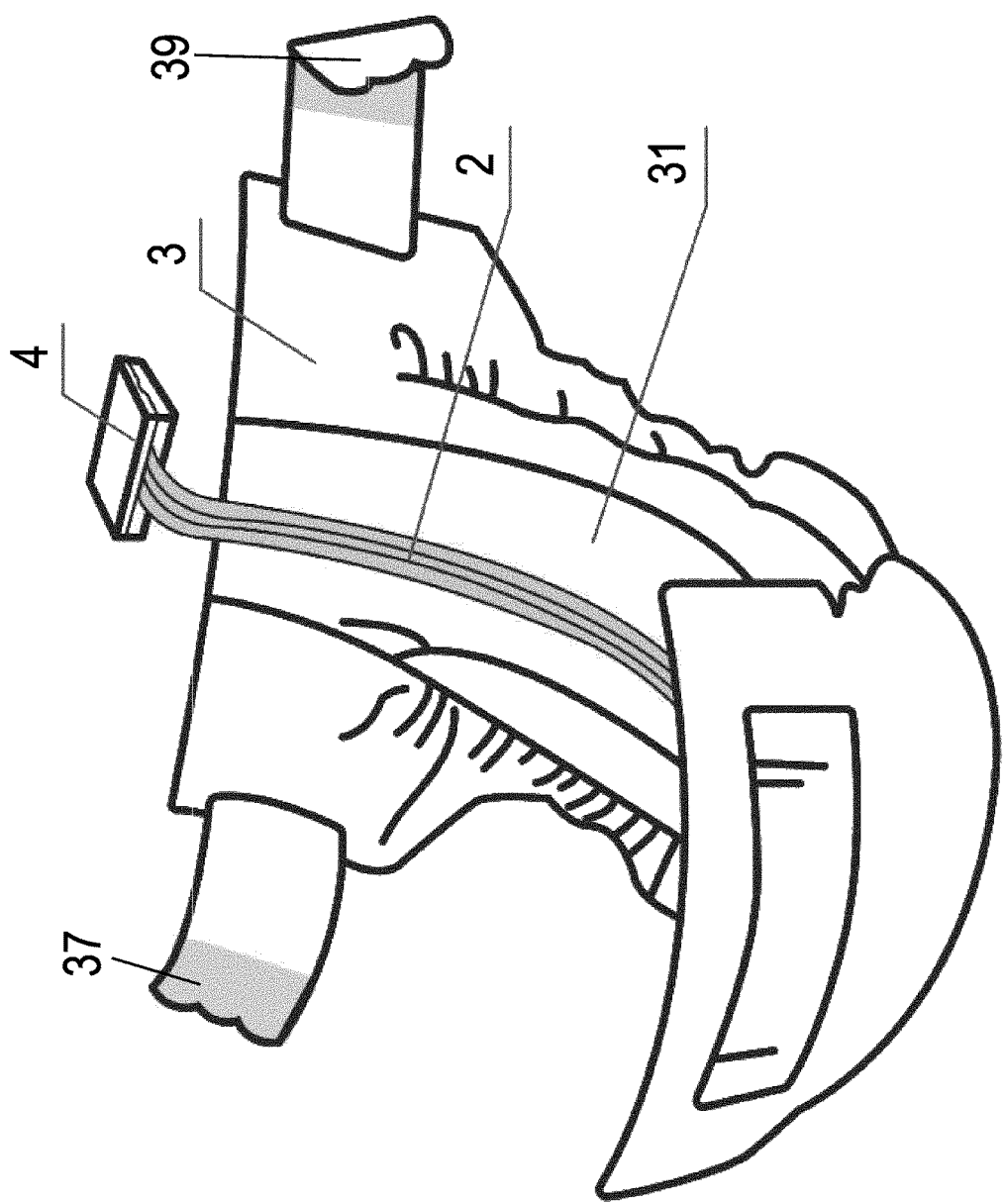
FIG. 1 is a perspective view of a diaper provided with a detecting device according to the invention.
Figure 4:
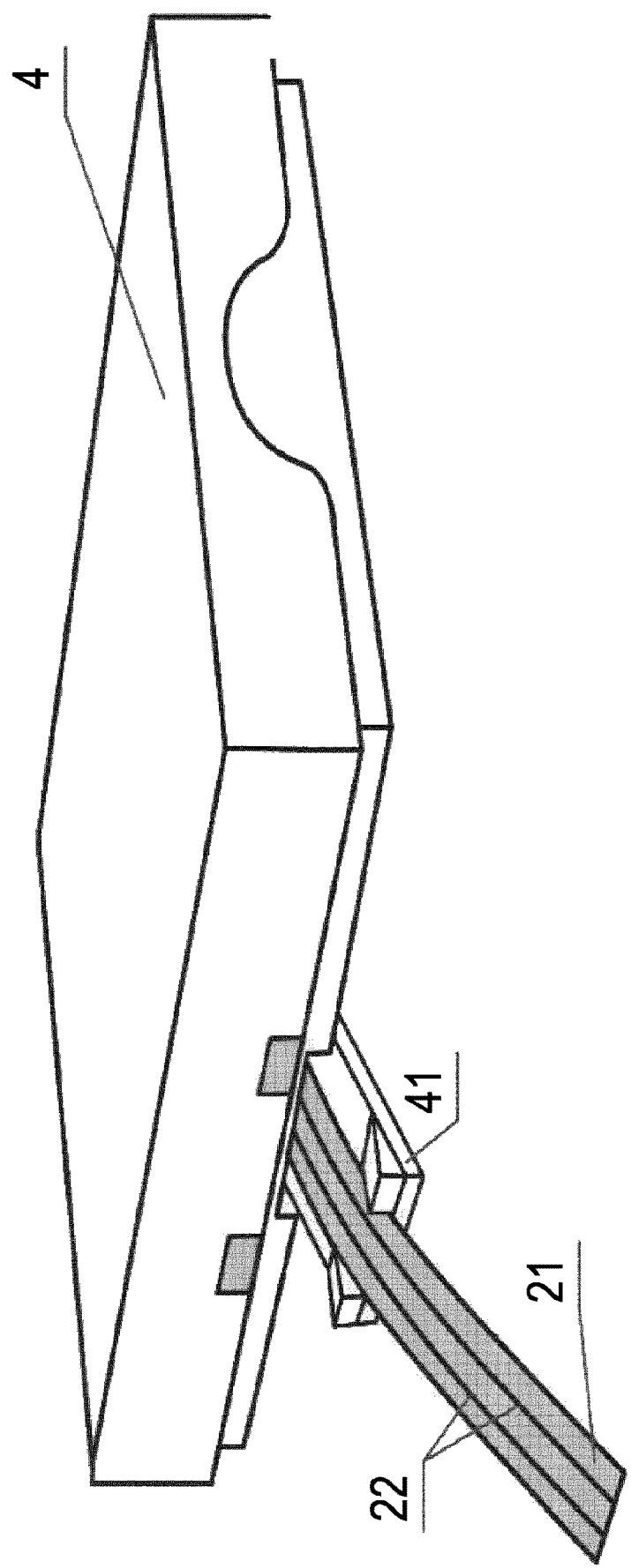
FIG. 4 is a perspective view showing the coupling portion of the conducting unit and a measuring device.
Figure 5:
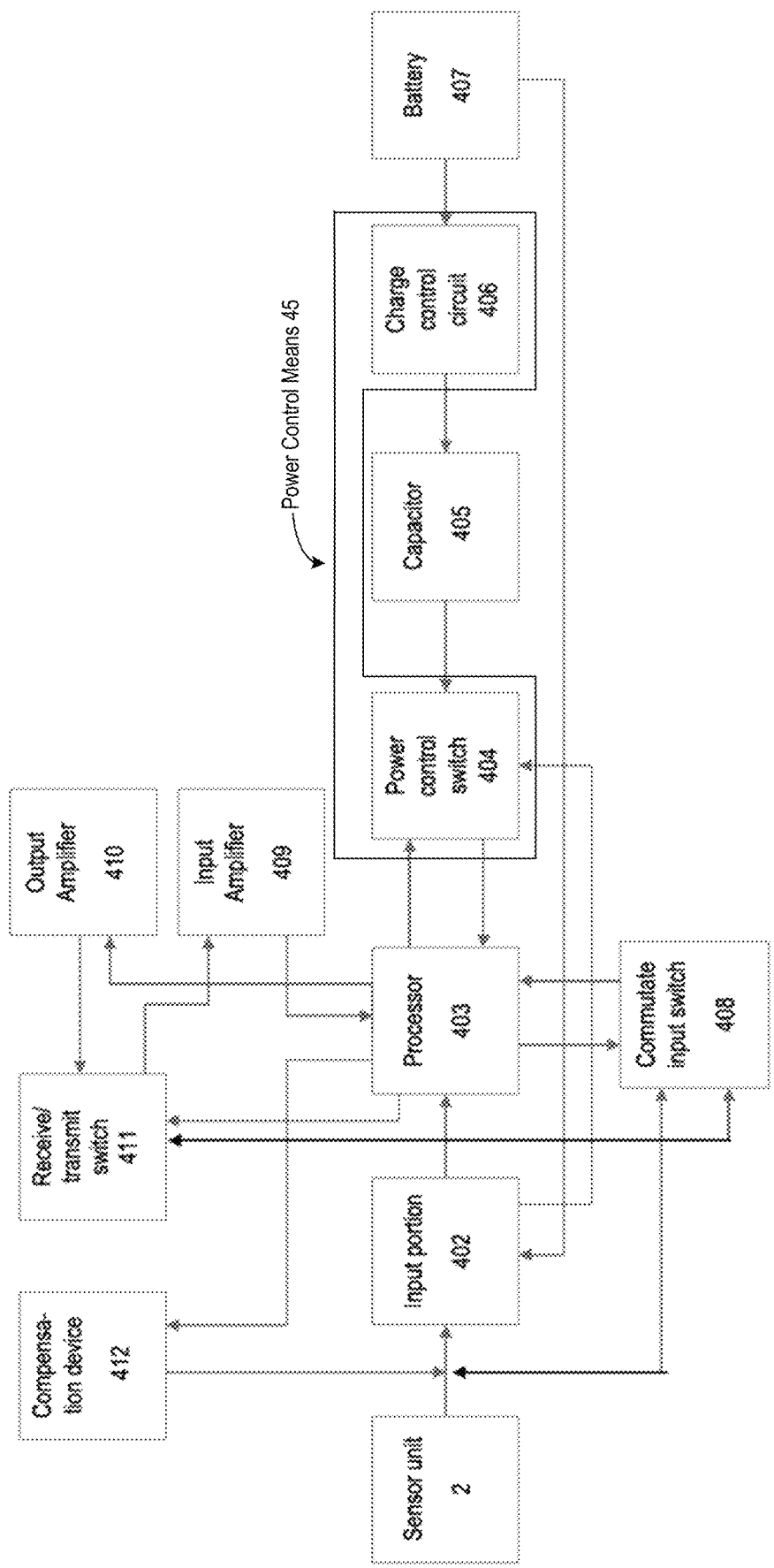
FIG. 5 is a block diagram of the measuring device including the resonant scanning measuring device.

The measuring device 4 shown in FIGS. 1 and 4 comprises an input portion 402, which is connected to the sensor unit 2 via the plug 41 of the measuring device 4 being connectable with the plug 24 of the sensor unit 2. The measuring device 4 further comprises a processor 403 configured to receive signals corresponding to values of the electrical parameters R, L, C, Z detected by the sensor unit 2 and to process said signals. Furthermore, as shown in FIG. 5, the measuring device 4 includes a power control means 45 including a power control switch 404 and a charge control circuit 406 configured to control electrical power supplied from a power supply (battery 407). The processor 403 further includes determination means of the measuring device 4 configured to determine, based on evaluating the processed signals using predetermined thresholds of the electrical parameters R, L, C, Z during predetermined time periods, whether a state of a diaper 3 has changed. The measuring device 4 further includes a transmitting means arranged for transmitting information regarding the determined state change to a receiving means. In the embodiment, the transmitting means is provided integrally with the processor. The measuring device 4 is configured to perform a resonance scan, during which a periodic signal is sent to the sensor unit 2 at a plurality of frequencies. The resonance scan will be described in more detail later.

The measuring device 4 is further provided with a capacitor 405 electrically connected in parallel to the power supply, wherein the power control means 45 is configured to control a current flowing from the capacitor 405 and the power supply to remain below a predetermined limit. The power supply is a replaceable battery 407 disposed inside the measuring device 4.

The measuring device 4 further comprises a housing shown in FIG. 4 provided with attaching means (not shown), configured to detachably attach the measuring device 4 to a non-inner surface of the diaper 3.

When using the detecting device 1 for detecting a state of a diaper 3, as a first step, the sensor unit 2 is attached to the bottom part of the diaper 3 with the end of the sensor unit 2 provided with the coupling portion 25 being bent over edge of the diaper 3. In a second step, the plug 24 is plugged into a plug 41 of the measuring device 4 and fixed thereto by means of a socket visible in FIG. 4.

Regarding the function of the detecting device 1, it is to be noted that in a first state of the diaper 3, an electrical connection between the two electrodes 22 is disconnected, and in a second state of the diaper 3, an electrical connection between the two electrodes 22 is caused by a body liquid which functions as a conducting substance accumulated in a space between the electrodes 22.

Furthermore, during operation, the power control means 45 applies a sinusoidal alternating voltage to the electrodes 22. Further, the power control means 45 set a periodic signal for resonance scan to preset frequencies, which are set so as to correspond to respective resonance frequencies of particular substances or ingredients of the substance expected to penetrate the diaper 3, thereby causing resonance oscillation of the substance or ingredient of the substance. As a next step, the processor 403 evaluates the received electrical parameters R, L, C, Z by determining that a predetermined substance is present in the space between the electrodes 22 of the conducting unit 22, when the evaluated electrical parameter is within a range that is preset with regard to the particular substance.

As shown in FIG. 1, the diaper 3 according to the embodiment of the invention comprises an absorption zone 31 that absorbs liquid or solid waste matter. The absorption zone 31 is configured by using materials usually used for diaper 3 production. The diaper 3 is provided with the detecting device 1 described above with the sensor unit 2 thereof being attached to the absorption zone 31 of the diaper 3 and the carrier layer 21 remaining disposed between the conducting unit 22 and the absorption zone 31. The measuring device 4 is placed in a pocket section 33 of the diaper 3, said pocket section 33 being provided on a posterior side of the diaper 3 when worn by a user.

Figure 9A:
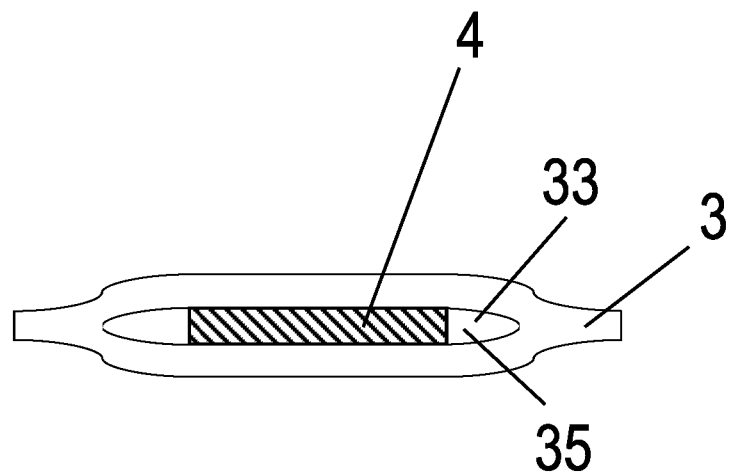
FIG. 9A shows a cross section of a part of a diaper equipped with a measuring device according to the embodiment.

As shown in FIG. 9A, the pocket section 33 is formed as a recess 35 in the diaper 3 material so that the pocket section 33 is configured to fully wrap the measuring device 4 in a state, in which the measuring device 4 is connected to the sensor unit 2 and attached to the diaper 3.

The above description refers to one embodiment of the present invention. However, the features of the detecting device 1 and the diaper 3 can be modified in different ways. According to an embodiment of the detecting device 1, a fixing means for fixing the conducting unit 22 to the carrier layer 21 is provided and consists of a material which does not absorb liquid.

According to a modification of the diaper 3, the pocket section 33 of the diaper 3 can be formed by simply overlapping parts of the diaper 3 in the process of its attachment to the user. In general, the pocket section 33 can be also provided on an anterior side of the user, or more preferably on a lateral side of the user.

DETAILED DESCRIPTION OF THE EMBODIMENT AND ITS OPERATION

The detecting device 1 for detecting a state of a diaper 3 described below is an embodiment of the present invention. The detecting device 1 described herein is intended as a diaper 3 monitoring system comprising a reusable measuring device 4 and a disposable sensor, which may be embedded in a diaper 3 during initial manufacturing or provided as an independent product to be embedded by a caregiver. The diaper 3 is worn by a user, for example an infant, a toddler, a child, a person of advanced age or a person impaired by movement difficulties or an incapacitating illness.

The detecting device 1 is capable of detecting and recording events (urination or defecation) on a timely basis, event analysis, wireless notification of a caregiver as well as resonance scanning of urine and feces for the presence or absence of certain substances in them. This leads to a timely replacement of the diapers and elimination of discomfort and illness due to an inappropriate change of diapers and to a possibility of an early diagnostics as well.

The detecting device 1 consists of three main components provided to a diaper: a sensor unit 2, a measuring device 4 (measuring device 4), and an application connected to a server/cloud storage.

The sensor unit 2 of the detecting device is disposable and the measuring device 4 is for multiple use. The sensor unit 2 shown in FIGS. 1 to 4 is embedded in the diaper 3 (or inserted therein additionally) and comprises a conducting unit 22 consisting of two or more electrodes 22 (conductive elements) spaced apart so that there is no electrical connection between them. The sensor unit 2 ends with a coupling portion 25 (e.g. a plug 24) for connection to the measuring device 4. Thus, the sensor unit 2 can be considered as an electric capacitor 405 or inductance with variable parameters. The variability of the parameters is established by the environment. The sensor unit 2 is connected to the measuring circuit of the measuring device 4.

Figure 6:
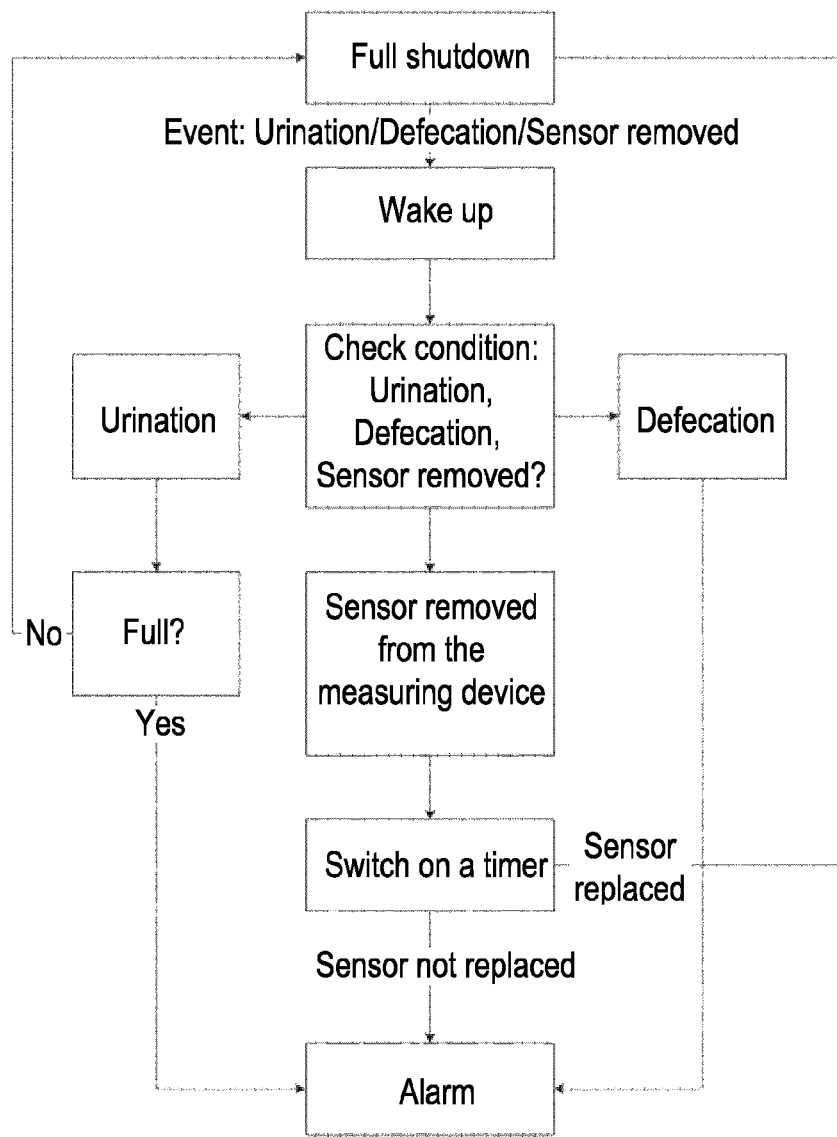
FIG. 6 is a flow chart showing the operation of the detection performed by the measuring device.
Figure 7:
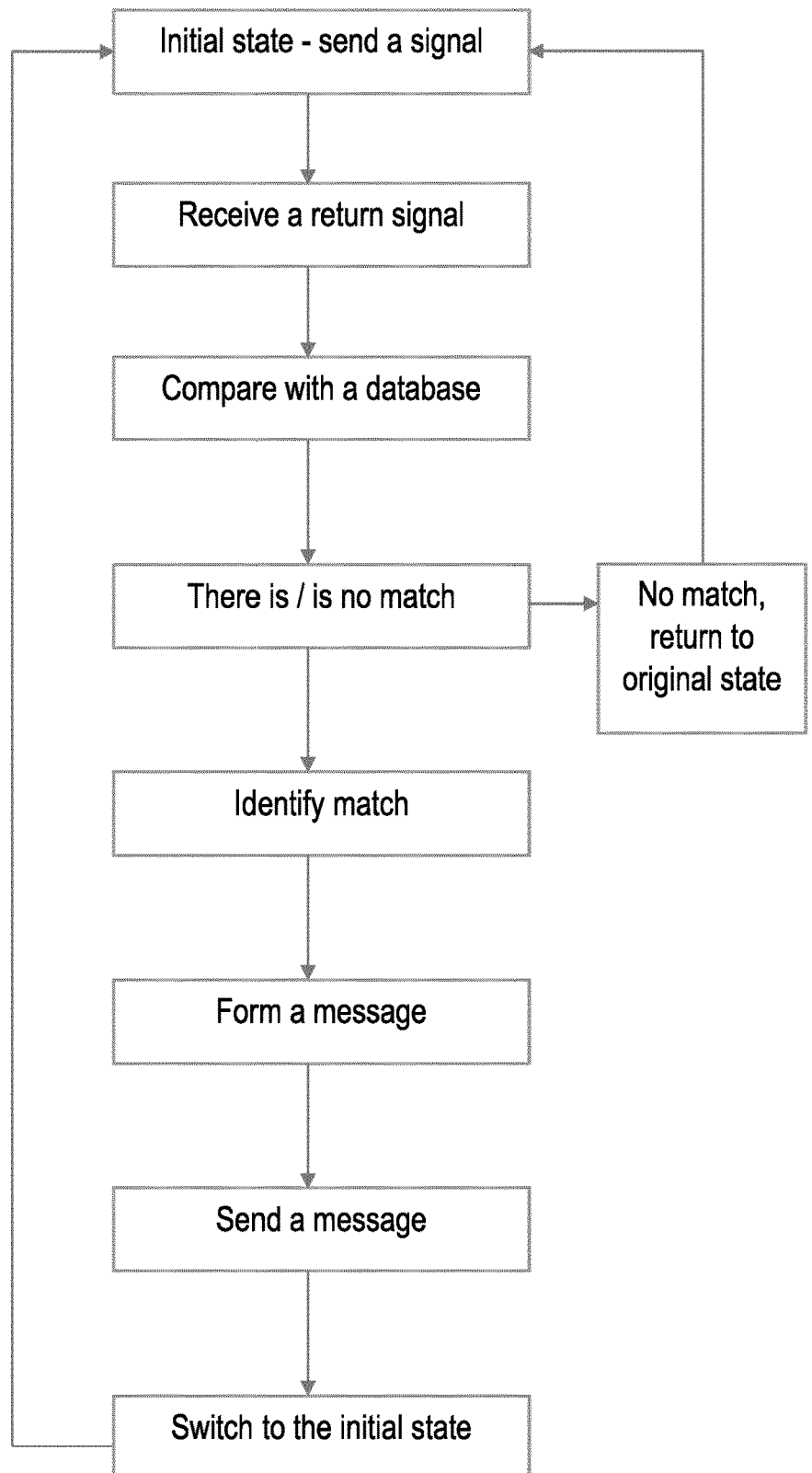
FIG. 7 is a flow chart showing the operation of the resonance scanning performed by the measuring device.

The measuring device 4 is designed according to a circuit diagram shown in FIG. 5 and has an operating algorithm shown in FIG. 6 for detecting events, as well as an operating algorithm shown in FIG. 7 for resonance scanning. The measuring device circuit consists of the following blocks: a sensor unit 2 (not part of the measuring device 4), an input portion 402, a processor 403 (including a built-in transmitter), a supercapacitor (capacitor 405), a charge control circuit 406, a battery 407, a power control switch 404, a commutate input switch 408, an input amplifier 409 (of the reflected signal), an output amplifier 410 (of the scanning signal), a receive/transmit switch 411 and a compensation device 412.

It is known from electrical engineering that each electrical component has several basic parameters: R—active resistance, L—inductance, C—capacitance, Z—impedance and their reciprocal values; as well as characteristic or wave resistance. Each of these parameters can be measured and the change in the values of these parameters is directly related to the changes in the environment in which it is placed.

In the case of a diaper 3, an event that changes the environment is an urination or a defecation. Upon occurrence of an event, the environmental parameters change by increasing or decreasing. The type of the input measured by the measuring device 4 is determined by an environmental parameter chosen for measurement. As an example, measuring of R (resistance) and p (conductivity) will be described.

The operating algorithm for detecting events is shown in FIG. 6. The detecting device 1 operates as follows:

The input portion 402 is provided by a comparator with a very high input resistance and low consumption (500 nA). Upon occurrence of an event, the comparator activates and produces an impulse that "awakes" the processor 403, thereby switching the processor 403 from a "full shut down" mode to a "deep sleep" mode. In this mode, only the CPU clock and some basic functions operate.

After a certain period of time, the processor 403 is connected by the commutate input switch 408 to the sensor in order to perform a control measurement. Depending on the measurement result, the processor 403 switches to a "full shutdown" mode or sends a signal for changing the diaper 3.

When a diaper 3 is dry, the resistance tends to infinity (over 200 MΩ) and effectively no current flows through the sensor unit 2. Upon urination, the sensor unit 2 gets wet and there is a sharp drop in the resistance and an increase in conductivity. This causes activation of the measuring device 4, putting it into a standby mode. Meanwhile, the urine is absorbed into the diaper 3. After a certain period of time (e.g., 100 to 300 seconds), the measuring device 4 measures the resistance or conductivity of the sensor unit 2 circuit. If the resistance or conductivity has passed a certain limit (predetermined threshold, for example R≥15 MΩ or R≥20 MΩ), the determining means determines that the diaper 3 is not full yet and switches to a "full shutdown" mode.

The purpose is saving energy stored in a power source. When next event of the same type occurs, the process is repeated, until the resistance or conductivity is found to be beyond another predetermined threshold (below or above, depending on the selected measured parameter, for example R being between 200 kΩ and 1 MΩ), that signifies that the top layer remains constantly wet, the diaper 3 is full and needs to be changed. This causes activation of a transmitter built into the measuring device 4, which sends a signal for changing of the diaper 3 to a receiving device. One, two, three, four or more "awakenings" of the measuring device 4 are possible in a cycle depending on the amount of the urine expelled and the absorption capacity of the diaper 3.

In case of defecation, operation is slightly different. The awakening event (change of the environmental parameters) is the same as described above, but the control measurement determines a higher resistance or a lower conductivity respectively, which means defecation. Feces do not absorb into the diaper 3 as opposed to the urine; this results in a higher resistance in the measured environment being maintained over a longer period of time. In this case, a signal for immediate change of the diaper 3 is sent.

A sensor is built-in into the measuring device 4, which detects whether the coupling portion 25 of the sensor unit 2 is plugged into the measuring device 4 plug 41. This is done in order to prevent forgetting the insertion of the measuring device 4 into the new diaper 3 when changing the diaper 3. When the coupling portion 25 of the sensor unit 2 is removed from the measuring device 4, the sensor detects this occurrence, a timer is switched on, and if the measuring device 4 is not connected to the sensor unit 2 within a specified time (e.g. 300 seconds), a reminder signal or message is sent.

The measurement process described above can be applied by analogy when measuring other parameters: capacitance, inductance and impedance. The measured parameter depends on the specific design solution and the measurement accuracy that is sought. For each type of measurement, the input measuring section of the measuring device 4 has a different circuit diagram. However, input circuits for measuring such parameters are well-known to the skilled person, thus a detailed description thereof is omitted.

In order to achieve a long battery life, the connection diagram of FIG. 5 is provided. It is known that the battery life shortens considerably by an abrupt surge in power consumption. In this respect, lithium-ion batteries are particularly sensitive to this mode of operation and very quickly lose their capacity. In the case of the detecting device 1 for detecting a state of a diaper 3, the abrupt power consumption occurs when the transmitter is activated. As a specific example, in "full shutdown" mode, the power consumption is 1 μA, in "deep sleep" mode between 9 and 15 μA, when sending a signal by Bluetooth between 13 to 15 mA, and when sending a signal by a Wi-Fi module roughly 76 mA.

In order to avoid such surges in loads of the battery 407, the power circuit is provided with a high-capacitance capacitor 405 (capacity of 2.5 F) connected in parallel to the battery 407, which is charged through a suitable integrated circuit regulator (charge control circuit 406). The charge control circuit 406 charges the capacitor 405 via a defined algorithm and monitors the maximum current consumed from the battery 407 not to exceed a predetermined value, e.g. 1 mA. When the transmitter is activated, the required power is supplied by the capacitor 405 and the battery 407 is not overloaded. Thus, according to experiments performed by the inventor, the battery life is extended between 20 and 100 times depending on the components used and the method for data transmission (Wi-Fi or Bluetooth) compared to a case, in which the capacitor 405 is not provided.

An application from a site, server or cloud is provided for activation of the detecting device 1, communication of events from the diaper 3 equipped with the detecting device 1 to the application, and communication of instructions from the application to the detecting device. This application is installed on a phone, a tablet or a computer, and therewith, the measuring device 4 is activated and coupled with the application. The application keeps statistics and displays information on demand. Since such applications and suitable transmission solutions are well-known from prior art, a detailed description thereof is omitted.

The measuring device 4 (control circuit) can also be used for resonance scanning for substances and small objects (sizes less than 200 μm). A circuit diagram of the measuring device 4 suitable for resonant scanning is represented in FIG. 5 and the algorithm of operation is represented in FIG. 7.

It is known from prior art that all substances and microorganisms (objects) have a resonance frequency. When substances are dissolved in a conductive environment and an electric current with a certain frequency, which is resonant with the natural frequency of the object, is passed through them, there is an increase of the resultant current. Thus, the presence of certain substances and microorganisms can be identified in the subject of research. The higher the concentration of a substance or object is, the stronger signal will be detected.

More specifically, when an electric current passes through an object (a bacterium or a virus) with a frequency equal to or close to the resonant frequency of the object, the object begins to oscillate with the same frequency. The result is a superimposition of both waves in phase, which leads to an increase in the signal amplitude. For example, the bacterium *E. Coli* has a resonant frequency of 356 kHz, while the resonant frequency of influenza A and B (common flu) viruses is 313.35 kHz and 323.9 kHz, respectively. Each virus, bacterium, molecule or individual atom has its own strictly specific resonant frequency, which is constant and depends on the size and structure of the object. The resonance frequencies can be easily determined within a few seconds in a laboratory setting from a sample of the object. The determined resonance frequencies can be stored in a database in the measuring device 4.

According to the invention, the processor 403 is configured to send a set of periodic electrical signals with different frequencies to the sensor unit 2 and to track their amplification by evaluating the received electrical signals. The presence of a particular substance or object is determined depending on the frequency at which the signal is amplified. The resonant frequencies of the searched objects are known in advance and are stored into the processor 403 memory as predetermined frequencies. In this embodiment, the process itself runs very quickly and within 1 second 1000 different frequency channels can be scanned, i.e. 1000 different substances or objects. The frequency range in this embodiment is between 4 Hz and 1 MHz and depends on the size and structure of expected objects or substances. During the analysis, harmonics of the basic scanning frequency can also be used in order to improve accuracy.

The operating algorithm for resonance scanning is shown in FIG. 7. The detecting device 1 operates as follows:

The input portion 402 awakes the processor 403 when an event occurs. This event may be a regular detection event as described above, or a manual request for resonance scanning instructed by the user via the application.

The processor 403 is then connected to the sensor unit 2 by the switch and a control measurement of the environment is performed. The compensation device 412 is then activated in order to compensate the change of the C (capacitance) of the sensor unit 2 and the ratio R/L=G/C to remain valid (this process will be detailed below). Then, a scanning signal is sent. The signal is amplified to a set value by the output amplifier 410 and is sent to the sensor unit 2 via the receive/transmit switch 411. The reflected signal is sent to the input amplifier 409 via the receive/transmit switch 411, amplified to the set level, and then sent to the processor 403 for analysis. Afterwards, a comparison with the database and detection of the presence or absence of a substance or object are performed. The process is repeated with a switching frequency of receiving or transmitting of e.g. approximately 50 ns. The switching time may vary within certain limits depending on the environment parameters, for example between 40 and 60 ns.

The resonant frequencies of the desired substances or objects are programmed in the processor 403 as preset frequencies. As described above, the frequencies are universal and constant, and are not affected by the environment or otherwise altered under regular conditions. The resonant frequencies are determined only by the size and structure of the object. When the scan mode is activated, the processor 403 generates the frequencies sequentially and sends them to the sensor unit 2 through the output amplifier 410. The amplified signal is passed to the sensor unit 2 through the receive/transmit switch 411 and the commutate input switch 408. The signal which is reflected based on e.g. the radar principle is passed through the commutate input switch 408 and the receive/transmit switch 411 to the processor 403 for analysis. Alternatively, separate devices can be used for transmitting and receiving the signal in order to improve accuracy at the cost of a slower scanning speed. The processor 403 analyzes the input signal based on the amplitudes of the different frequencies and compares them to the preset frequencies. When a deviation from these values is detected, the information is sent to the application for visualization of the registered deviations.

Generally, the sensor unit 2 can be represented as a transmission line with distributed parameters, i.e. the electrical energy conversion components (inductance, capacitance and resistance) are evenly or unevenly distributed along the line. For a proper measurement of the resonant frequencies, the line created by the sensor unit 2 has to fulfill the following condition: the main electrical parameters R, L, C and G have to be in the following relationship R/L=G/C, wherein R is the active resistance, G is the conductance, L is the inductance and C is the capacitance. These are the initial parameters before the occurrence of an event, i.e. the sensor unit 2 is dry and the external fields (magnetic and electromagnetic) are within certain minimum limits and do not affect the practical measurement. As the frequencies with which the resonance scanning is performed have a wide frequency range, the conditions described above are necessary to ensure a sustained transmission of the signal through the sensor unit 2. There are three main parameters that characterize the spread of an electromagnetic wave in a conductive environment: damping ratio $\alpha$, phase velocity v and characteristic resistance Zc. These parameters are frequency dependent.

Regarding compensation performed by the compensation device 412: only when the condition detailed above (R/L=G/C) is met, the parameters $\alpha$, v and Zc become frequency independent and a sustained spread of electromagnetic waves over a wide spectrum of frequencies is provided. When an event occurs (urination or defecation), the environmental parameters change: the conductivity increases, the resistance decreases, the inductance remains relatively constant (for measurement purposes), and the capacitance increases (due to the E-dielectric constant increase e.g. from 1 to 75). As the change of G relative to R is linear and L remains relatively constant, it is necessary to enter compensation of C so that the environment remains balanced for the measurement purposes. In this situation, the circuit changes its character. The evenly distributed parameters become unevenly distributed along the circuit. This change is registered by the control software of the measuring device 4, and respective compensations are entered for correctness of the measurement. The compensations are determined according to the changes of the parameters R, G, C and L, which changes are described above. Since R and G are reciprocal values and L practically does not change, the algorithm for changing C is derived from the change of R.

Since the dependence is linear, the compensation is output as a function of C from R/G. Accordingly, compensations are provided which can be stored in the measuring device 4.

Thereby, resonance scanning can be performed.

MODIFICATIONS

In the sensor unit 2 according the embodiment, the conducting unit 22 is directly attached to the carrier layer 21 via an adhesive layer. As an alternative, the electrodes 22 of the sensor unit 2 can be formed as an adhesive layer on the carrier layer 21.

Figure 8A:
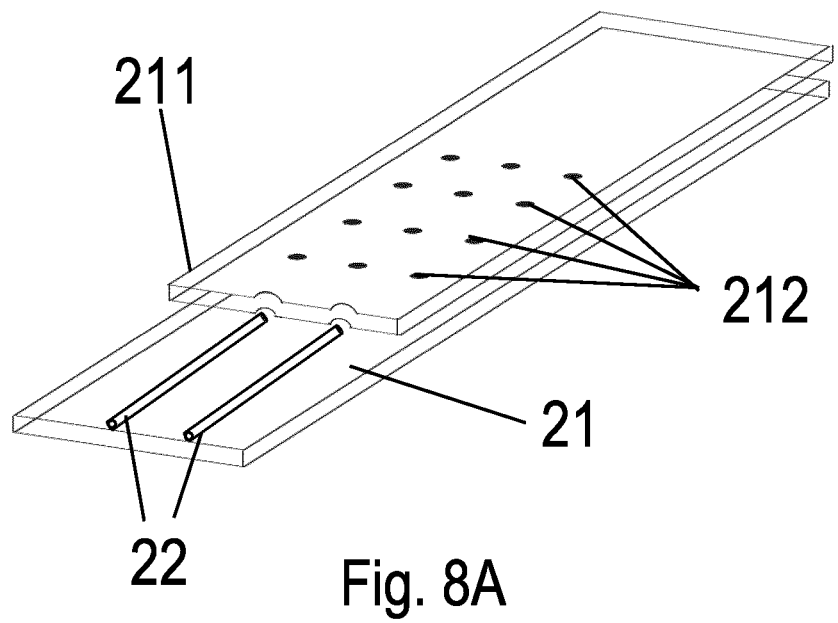
FIG. 8A is a perspective view showing a sensor unit according to a modification of the embodiment the invention.
Figure 8B:
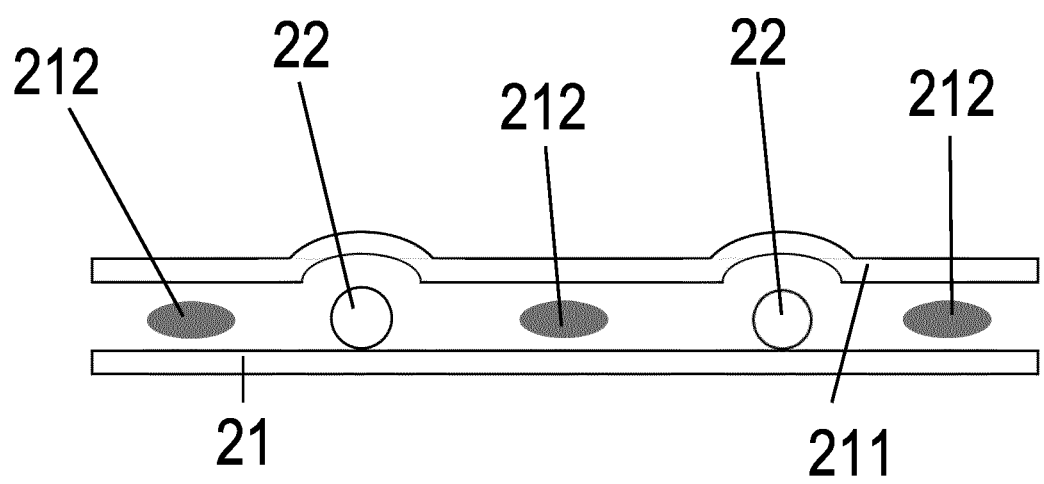
FIG. 8B shows a cross section of the sensor unit shown in FIG. 8A.

A first modification of the embodiment provides a cover layer 211. FIG. 8A is a perspective view showing a sensor unit 2 according to the first modification. Note that in FIG. 8A, a part of the cover layer 211 is hidden in order to render the electrodes 22 visible. FIG. 8B shows a cross section of the first modification, taken in a section plane perpendicular to a longitudinal direction of the electrodes 22.

The cover layer 211 is arranged on top of the carrier layer 21, which is identical to the carrier layer 21 according the embodiment. The cover layer 211 is made of a material identical or similar to that of the carrier layer 21, e.g. a non-woven textile. The electrodes 22 of the conducting unit 22 are sandwiched between the carrier layer 21 and the cover layer 211, and the carrier layer 21 and the cover layer 211 are fixed to each other by a plurality of cover layer fixtures 212.

The plurality of cover layer fixtures 212 visible in FIG. 8B are, for example, points of glue or another adhesive, provided on both sides of the two electrodes 22. As visible in FIG. 8A, the cover layer fixtures 212 are repeated at intervals along the longitudinal direction of the electrodes 22. In this example, three cover layer fixtures 212 are provided at each step along the longitudinal direction, the steps are repeated at regular intervals along the longitudinal direction of the electrodes 22, and the cover layer 211 and the cover layer fixtures 212 are provided along the full length of the carrier layer 21.

Alternatively, the cover layer fixtures 212 can be formed by hot press molding, for example by running the sandwiched carrier layer 21, cover layer 211 and conducting unit 22 through two rotated cylindrical bodies provided with heated nubs, so as to locally melt the carrier layer 21 and cover layer 211, thereby establishing a mechanical connection. Each cylinder can be provided with three heated nubs disposed at a distance corresponding to the distance between the fixtures in FIG. 8B, while the nubs can be repeated circumferentially on the cylinder with a circumferential distance equal to the repeating distance in the longitudinal direction.

Note that, in this modification, the electrodes 22 are not provided along the full length of the carrier layer 21. As visible in FIG. 8A, the electrodes 22 are terminated at a distance from an end of carrier layer 21. The end of the carrier layer 21 that is visible in FIG. 8A is the end opposite to the coupling portion 25. By not providing the electrodes 22 along the full length of the carrier layer 21, less material is required for manufacturing of the electrodes 22.

Alternatively, the electrodes 22 can be provided along the full length of the carrier layer 21, thereby enabling bulk production of a sensor unit 2 of a theoretically infinite length, which can be cut to an appropriate length before being provided with the coupling portion 25. In said bulk production, the carrier layer 21, cover layer 211 and electrodes 22 can be continuously supplied by rolls or other suitable forms of storage, fixed by the above-described hot press molding, and continuously rolled or stored for further processing. Since an adhesive does not need to be applied, manufacturing is simple and only includes the hot press molding step. Thereby, manufacturing costs can be reduced.

Furthermore, with the structure according to the modification, the electrodes 22 are covered from both sides. Thereby, skin irritation of the user can be further reduced.

Figure 9B:
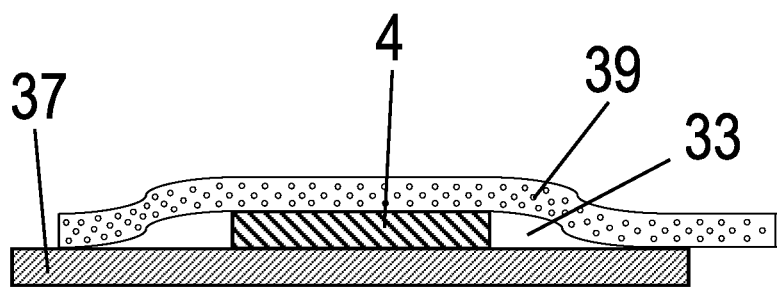
FIG. 9B shows a cross section of a part of a diaper equipped with a measuring device according to a modification of the embodiment.

A second modification example provides the pocket section 33 via overlapping parts of the diaper 3. FIG. 9A shows a cross section of a diaper 3 equipped with a measuring device 4 according to the embodiment. The cross section is taken in a direction perpendicular to a longitudinal direction of the measuring device 4 in a state, in which the measuring device 4 is attached to the diaper 3. FIG. 9B shows a cross section of a diaper 3 equipped with a measuring device 4 according to the second modification of the embodiment.

As shown in FIG. 9A, according to the embodiment, the measuring device 4 is accommodated in the recess 35, which forms the pocket section 33. According to the second modification, the pocket section 33 can be formed by overlapping parts of the diaper 3. Generally, adhesive strips or other overlapping parts of the diaper 3 are used for securing the diaper 3 to the user. These adhesive strips are shown in FIG. 1 and FIG. 9B as a first overlapping portion 37 and a second overlapping portion 39. By forming the pocket section 33 by overlapping parts of the diaper 3, effort to be provided by the caregiver when applying the diaper 3 to the user is reduced. Note that in the diaper 3 shown in FIG. 1, the overlapping portions are configured to overlap at the front (on an anterior side) of the diaper 3, so that the measuring device 4 must also be provided on the anterior side. However, the area at which the overlapping portions are configured to overlap can be chosen freely and the measuring device 4 is positioned accordingly.

Detecting device for detecting a state of a diaper, comprising a sensor unit with: a conducting unit including at least two electrodes, the electrodes being configured to detect electrical parameters of their environment; a coupling portion on at least one end side of the conducting unit, the coupling portion being connectable to a measuring device; and a carrier layer to which the conducting unit is attached. The measuring device comprises an input portion being connectable to the sensor unit; a processor configured to receive signals corresponding to values of the electrical parameters detected by the sensor unit and to process said signals; a power control means configured to control electrical power supplied from a power supply; a determination means configured to determine, based on evaluating the processed signals using predetermined thresholds of the electrical parameters during predetermined time periods, whether a state of a diaper has changed; and a transmitting means arranged for transmitting information regarding the determined state change to a receiving means. The measuring device is configured to perform a resonance scan, during which a periodic signal is sent to the sensor unit at a plurality of frequencies.

REFERENCE SIGNS LIST

Detecting device 1
Sensor unit 2
Carrier layer 21
Conducting unit 22
Electrodes 22
Longitudinal ends 23
Plug (of coupling portion) 24
Coupling portion 25
Cover layer 211

Cover layer fixtures 212
Diaper 3
Absorption zone 31
Pocket section 33
Recess 35
First overlapping portion 37
Second overlapping portion 39
Measuring device 4
Plug (of measuring device) 41
Power control means 45
Input portion 402
Processor 403
Power control switch 404
Capacitor 405
Charge control circuit 406
Battery 407
Commutate input switch 408
Input amplifier 409
Output amplifier 410
Receive/transmit switch 411
Compensation device 412
Electrical parameters R, L, C, Z

The invention claimed is:

1. A detecting device for detecting a state of a diaper, said detecting device comprising:
 a sensor unit comprising
 a conducting unit including at least two electrodes, the electrodes being configured to detect electrical parameters (R, L, C, Z) of their environment; and
 a carrier layer to which the conducting unit is attached; wherein
 a measuring device comprises
 an input portion being connectable to the sensor unit;
 a processor configured to receive signals corresponding to values of the electrical parameters detected by the sensor unit and to process said signals;
 a power control means configured to control electrical power supplied from a power supply; and
 a determination means configured to determine, based on evaluating the processed signals using predetermined thresholds of the electrical parameters during predetermined time periods, whether a state of a diaper has changed;
 wherein
 the sensor unit further comprises a coupling portion on at least one end side of the conducting unit, the coupling portion being connectable to a measuring device;
 the measuring device further comprises a transmitting means arranged for transmitting information regarding the determined state change to a receiving means; and
 the processor of the measuring device is configured to perform a resonance scan, during which a periodic signal is sent to the sensor unit at a plurality of frequencies,
 wherein
 the power control device is configured to generate the periodic signal for resonance scan at preset frequencies, which are set so as to correspond to respective resonance frequencies of predetermined substances or predetermined ingredients of the predetermined substances, thereby causing resonance oscillation of the predetermined substances or predetermined ingredients of the predetermined substances to differentiated between urine and feces.

2. The detecting device according to claim 1, wherein the measuring device further comprises
 a capacitor electrically connected in parallel to the power supply; and wherein
 the power control device is configured to control a current flowing from the capacitor and the power supply to remain below a predetermined limit.

3. The detecting device according to claim 1, wherein the electrodes are made of an adhesive material.

4. The detecting device according to claim 1, wherein the carrier layer is made of a liquid absorbing material.

5. The detecting device according to claim 1, further comprising a fixing device for fixing the conducting unit to the carrier layer, wherein the fixing device does not absorb liquid.

6. The detecting device according to claim 1, wherein the measuring device further comprises a housing provided with attaching device, configured to detachably attach the measuring device to a diaper surface.

7. The detecting device according to claim 1, wherein, in a first state of the diaper, an electrical connection between the two electrodes is disconnected, and in a second state of the diaper, an electrical connection between the two electrodes is caused by a conductive substance accumulated in a space between the electrodes.

8. The detecting device according to claim 7, wherein the processor is configured to evaluate the received electrical parameters, wherein it is determined that the predetermined substance is present in the space between the electrodes of the conducting unit, when the evaluated electrical parameter is within a range that is preset with regard to said predetermined substance.

9. The detecting device according to claim 8, wherein
 the predetermined substance is one of a virus, a bacterium, a molecule or an individual atom.

10. The detecting device according to claim 1, wherein the power control device is configured to apply a sinusoidal alternating voltage to the electrodes.

11. A diaper comprising:
 an absorption zone configured to absorb liquid or solid waste matter;
 a detecting device according to claim 1, and
 a measuring device attaching device for attaching the measuring device to a non-inner side of the diaper when worn by a user; wherein
 a sensor unit is arranged in said absorption zone, and
 the measuring device attaching device is formed by a pocket section of the diaper.

12. The diaper according to claim 11, wherein the pocket section is formed by overlapping parts of the diaper.

13. The diaper according to claim 11, wherein the pocket section is formed as a recess in a diaper material.

14. The diaper according to claim 11, wherein the pocket section is configured to fully wrap the measuring device in a state, in which the measuring device is connected to the sensor unit and attached to the diaper.

15. The diaper according to claim 11, wherein the carrier layer of the sensor unit is disposed between the conducting unit and the absorption zone.

16. The diaper according to claim 11, wherein the measuring device attaching device is provided on a posterior side of the user, or preferably on an anterior side of the user, or more preferably on a lateral side of the user.

\* \* \* \* \*